June 5, 1951  E. B. PRATT  2,555,507
METHOD OF REDUCING METALLIC OXIDE ORES
Filed Dec. 2, 1949
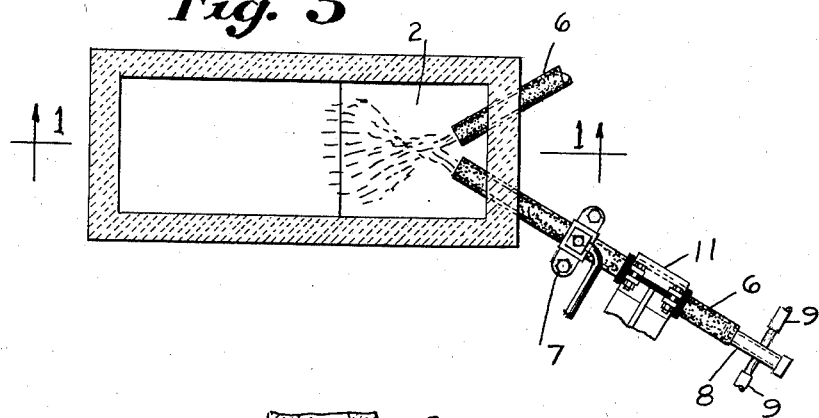
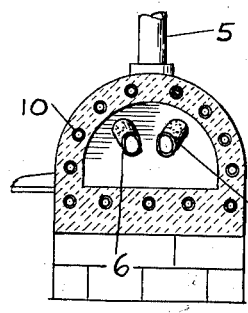
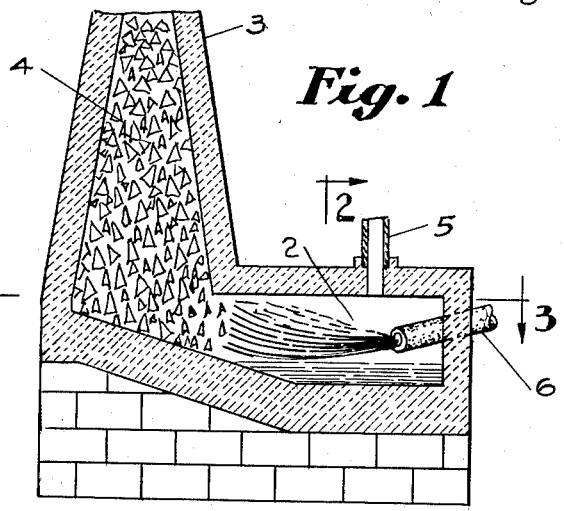
Emil Bruce Pratt
*INVENTOR.*
BY

UNITED STATES PATENT OFFICE 2,555,507

METHOD OF REDUCING METALLIC OXIDE ORES

Emil Bruce Pratt, East Cleveland, Ohio

Application December 2, 1949, Serial No. 130,663

4 Claims. (Cl. 75—10)

This invention relates to the production of hydrogen in either the molecular or atomic state, and to its control and use as reducing agent in the reduction of metallic oxide ores; and its use as a means for removing sulphur and/or phosphorus from said ores.

Whereas hydrogen has been too expensive in the past to be used extensively for such purposes, the herein described process provides a way to produce large quantities of hydrogen very cheaply. It is available in geographical locations where both natural gas and electricity are cheap, such as at points on the T. V. A. lines. Briefly, it consists in the reaction:

(1) $\qquad CH_4 + H_2O = CO + 6H$

The symbol 6H is used instead of $3H_2$ because the hydrogen so generated and under the conditions pertaining to its introduction into the reduction retort are such that a substantial quantity is in the atomic state. Cheap hydrogen also exists as a by-product in limited quantities in connection with a few industries.

One result of the use of hydrogen as reducing agent is the production of metals free from, or low in, carbon content. This is especially important in its relation to ferrochromium and stainless steel.

Another result of using hydrogen as reducing agent as herein described is the prevention of sulphur and/or phosphorus, present in many ores, from entering the metal during the reduction of the ore. These obnoxious elements are present in some iron ore deposits to such an extent as to render the deposits unsuitable for use by previous processes. Henceforth such deposits may become usable by virtue of the fact that molecular hydrogen, and especially atomic hydrogen as herein described, combines with the sulphur to form $H_2S$, and with the phosphorus to form $PH_3$, gases which pass out of the furnace.

The value of atomic hydrogen as reducing agent lies in its extraordinary free energy, or chemical reactivity, which probably exceeds that of any other known substance which is controllable. For this reason it is especially suitable to the reduction of the more difficultly reducible oxides such as $SiO_2$ and $(CrO_2)_2Fe$, and the like, while molecular hydrogen may be used for the more easily reducible oxides, such as iron ore and the like.

Although silicon is not strictly a metal, but a metalloid, it is called herein a metal. The phrase "substantial quantities of atomic hydrogen" means the necessary percentages of atomic hydrogen contained in the gases in the retort in order to reduce the metallic oxides quickly before the oxides become submerged in the bath, under the conditions then existing in the retort.

Atomic hydrogen may be produced in any one of three ways, or in the joint use of more than one of them:

1. By dissociation of a compound containing hydrogen. At the moment of dissociation the hydrogen has in the past been called "nascent." Under normal conditions of temperature it immediately reverts to the molecular state. However, I have found that when its temperature is rapidly increased, as hereafter described, it retains the energetic qualities of its "nascent" state, from which fact I assume it to be in the atomic state.

2. By increasing the temperature of molecular hydrogen. Investigations have shown that molecular hydrogen is converted to the atomic state by heat at temperatures ranging from about 1700° C. to 3800° C. At 1727° C. about 4% of the gas is in the atomic state; at 2700° C. about 30% is in that state; and at 3800° C. about 100% is atomic hydrogen.

3. In connection with Patent No. 1,947,267, Dr. Irving Langmuir proved that cold molecular hydrogen is converted to atomic hydrogen by being passed through an electric arc.

In the drawing, Fig. 1 is a section taken on the line 1—1 of Fig. 3. Fig. 2 is a section taken on the line 2—2 of Fig. 1. Fig. 3 is a section taken on the line 3—3 of Fig. 1. 2 is the retort in which reduction of the finely pulverized ore takes place. 3 is the stack through which the waste gases escape. 4 is lumps of ore of sufficient size to permit the waste gases to escape easily. These lumps of ore present a comparatively cool surface to the escaping gases so that any volatilized or powdered metal being carried out of the retort by the gases may condense and be recovered. 5 is the tube through which is dropped the pulverized oxide ores. At the upper end of this tube is a gastight feeding device not shown in the drawings, as such devices are well known in the arts. 6 is the hollow, or tubular, carbon electrodes through which the gases are led into the retort, and in which they are preheated, and in which the reaction (1) $\qquad CH_4 + H_2O = CO + 6H$ takes place. 7 is an electric terminal. 8 is steel pipe with gas-tight cap, screwed into carbon electrodes, and having fittings for connecting the flexible tubing which carries the $CH_4$ and the $H_2O$. 9 is flexible tubing. The amount of $CH_4$ and $H_2O$ admitted to the electrodes is regulated and controlled by valves and meters not shown in the drawing because these are well understood in the arts. 10 is stainless steel tubing inserted in the walls of the retort between the interior and exterior courses of refractory material through which water or other coolant may be circulated, if needed, to keep the inner surfaces of the retort below the boiling point of the metal being produced. Said inside temperatures are determined by pyrometric instruments not shown in the drawings. 11 is the clamp and support for the electrodes by means of which they are moved. These clamps are insulated against the electrodes. The electrodes are never allowed to touch the bath.

It is a well known fact that cold gases are non-conductors, or insulators, of electricity; and that hot gases are good conductors. Therefore, an arc in cold air at ordinary pressure requires a high potential, and the current passes in a small straight line between the electrodes, whereas in a retort filled with hot gases, the gases are good conductors, the potential is much less for the same length of arc, and the current passes in a broad, circular-shaped field between the two electrodes. In my process the arc is maintained and controlled automatically by an apparatus known as "G-E Amplidyne," not shown in the drawings. An arc is struck between the two ends of the electrodes within the retort, and maintained automatically throughout the operation. When the hot ends of the electrodes have reached a temperature of about 2000° C., a small amount of $CH_4 + H_2O$ is admitted into both electrodes. The resultant gases will ignite at the hot ends of the electrodes within the retort, after which the amount of gas may be gradually increased until all air is driven out of the retort. The gas pressure within the retort is maintained slightly above the atmospheric pressure outside the retort.

In passing through the hot electrodes, the gases attain a very high temperature before emerging and coming into contact with the arc. As compared with the method of passing comparatively cold hydrogen through the arc in order to convert it to atomic hydrogen, this process of passing preheated hydrogen through the arc results in gases having a much higher temperature, and therefore more reactive. The reaction (1) $\quad CH_4 + H_2O = CO + 6H$ is complete at about 900° C., which, let us say, is about half way through the length of the electrodes. Since the temperature of the electrodes themselves at the hot end, where the arc is located, approaches the temperature of the arc, it seems reasonable to assume that the temperature of the gases at this point, just before entering the arc, would be in the neighborhood of 2000° C.

It is probable that whatever portions of the gases within the retort are not in the atomic state are in the ionized state. It is a well-known fact that ionized gases are more reactive chemically than those not ionized. The pulverized oxide ores entering this atmosphere are quickly robbed of their oygen, and the resultant particles of metal strike the cooler inside surfaces of the retort where they adhere, collect, and run onto the hearth, forming a bath. This process should be thought of as a "dust-collecting process" at high temperatures, accompanied by chemical reaction.

Although nearly all oxide ores contain impurities which must be removed by means of a slag or flux, this is not true in respect to $SiO_2$ which is an article of commerce without appreciable impurities, obtainable in various sizes such as "100 mesh," "200 mesh," and "300 mesh." When the temperature of the interior surfaces of the retort exceeds the melting point of the metal being treated, as indicated by pyrometric readings, finely pulverized oxides may be dropped through the tube 5. The rapidity of feeding this ore is co-ordinated with the amount of gas flowing through the retort, and with the current of electricity through the electrodes. The reaction for silicon is:

(2) $\quad SiO_2 + 4H = Si + 2H_2O$

The vaporized $H_2O$ is swept out of the furnace by the incoming gases.

Some reduction of the lumps of ore in the stack will occur, especially if the ore is easily reducible, such as iron ore. In this event, the finely pulverized ore in the retort may be omitted, the retort shortened in length, and the electrodes brought up close to the stack.

A preferred method exists in the treatment of chromite ore. This consists of first forming a bath of molten silicon, and then dropping chromite mixed with calcium oxide into the bath. Immediately the exothermic reaction occurs:

(3) $\quad 2Si + (CrO_2)_2Fe + 4CaO = Cr_2Fe + 2Ca_2SiO_4$

Where cheap by-product hydrogen is available, the procedures are the same as above outlined with the exception that molecular hydrogen is put through the electrodes instead of the mixture $CH_4 + H_2O$. Thus the hydrogen is preheated before emerging from the electrodes, and consequently is at a higher temperature after being circumambient the arc than would be the case were cold hydrogen put through the arc.

I claim:
1. The process for the reduction of metallic oxide ores to the metallic state which consists of producing a stream of gases comprising substantial quantities of atomic hydrogen by passing through tubular carbon electrodes natural gas and water in proportions per formula weight approximately equal to the equation $CH_4 + H_2O = CO + 6H$ while heating the electrodes by an electric current and an arc to a temperature which will cause the reaction to be completed within the electrodes, said arc and the exit ends of the electrodes placed within a retort in such manner that the emerging stream of gases shall fill the retort, and injecting into said stream of gases pulverized and separated grains of metallic oxides.

2. The process for producing low-carbon ferrochromium which consists of producing a bath of molten silicon in accordance with claim 1 and injecting into said bath chromite ore and calcium oxide in proportions per formula weight approximately equal to the equation $2Si + (CrO_2)_2Fe + 4CaO = Cr_2Fe + 2Ca_2SiO_4.$ 3. The process according to claim 1 while maintaining the inside surfaces of the retort at temperatures above the melting point and below the boiling point of the metal being produced.

4. The process according to claim 2 while maintaining the inside surfaces of the retort at temperatures above the melting point and below the boiling point of the metals being produced.

EMIL BRUCE PRATT.

(References on following page)

REFERENCES CITED

The following references are of record in the file of this patent:

UNITED STATES PATENTS

| Number | Name | Date |
|---|---|---|
| 866,561 | Becket | Sept. 17, 1907 |
| 1,803,221 | Tyrer | Apr. 28, 1931 |
| 1,863,681 | Amsterdam | June 21, 1932 |
| 1,865,180 | Faragher | June 28, 1932 |
| 2,074,819 | Weitzenkorn | Mar. 23, 1937 |
| 2,226,525 | Dolan | Dec. 24, 1940 |
| 2,303,973 | Armstrong | Dec. 1, 1942 |
| 2,367,262 | Brassert | Jan. 16, 1945 |
| 2,418,148 | Williams et al. | Apr. 1, 1947 |

FOREIGN PATENTS

| Number | Country | Date |
|---|---|---|
| 139,820 | Austria | Dec. 10, 1934 |
| 531,836 | France | Jan. 21, 1927 |